(12) United States Patent
Watkins

(10) Patent No.: US 8,055,757 B2
(45) Date of Patent: Nov. 8, 2011

(54) APPARATUS AND METHODS FOR A MESSAGE BUFFERING SYSTEM

(75) Inventor: Alan Wayne Watkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 11/306,602

(22) Filed: Jan. 4, 2006

(65) Prior Publication Data
US 2008/0228849 A1    Sep. 18, 2008

(51) Int. Cl.
*G06F 15/16* (2006.01)

(52) U.S. Cl. .......................... 709/224; 718/102; 719/318

(58) Field of Classification Search .................. 709/224; 718/102; 719/318
See application file for complete search history.

(56) References Cited

U.S. PATENT DOCUMENTS

| | | | |
|---|---|---|---|
| 5,729,540 A | 3/1998 | Wegrzyn | |
| 6,070,189 A | 5/2000 | Bender et al. | |
| 6,366,915 B1 * | 4/2002 | Rubert et al. | 707/10 |
| 6,421,677 B1 * | 7/2002 | DeKimpe et al. | 707/E17.005 |
| 6,470,388 B1 | 10/2002 | Niemi et al. | |
| 6,574,792 B1 | 6/2003 | Easton | |
| 2001/0003172 A1 * | 6/2001 | Skinner et al. | 702/187 |
| 2002/0078058 A1 * | 6/2002 | Bird et al. | 707/100 |
| 2002/0152268 A1 | 10/2002 | Kureshy et al. | |
| 2002/0165856 A1 * | 11/2002 | Gilfillan et al. | 707/3 |
| 2003/0055960 A1 | 3/2003 | Hain | |
| 2005/0021836 A1 | 1/2005 | Reed et al. | |
| 2006/0087409 A1 * | 4/2006 | Korzeniowski | 340/286.02 |
| 2006/0095472 A1 * | 5/2006 | Krikorian et al. | 707/104.1 |
| 2006/0271826 A1 * | 11/2006 | Desai et al. | 714/38 |
| 2007/0118866 A1 * | 5/2007 | Chen | 725/87 |

FOREIGN PATENT DOCUMENTS
JP    4118737 A    4/1992
JP    5108312 A    4/1996

* cited by examiner

*Primary Examiner* — Ajay Bhatia
(74) *Attorney, Agent, or Firm* — Patents on Demand, P.A.; Brian K. Buchheit; Scott M. Garrett (57) ABSTRACT

Techniques for implementing a log message buffering system are disclosed. To this end, a computer implemented method includes receiving log messages. The computer implemented method also includes associating log messages with items of work and organizing the received log messages according to the items of work. Each item of work contains one or more log messages. The computer implemented method also includes outputting organized log messages according to items of work to a logging subsystem.

20 Claims, 5 Drawing Sheets

APPARATUS AND METHODS FOR A MESSAGE BUFFERING SYSTEM

FIELD OF THE INVENTION

The present invention generally relates to apparatus and methods for a message buffering system, and more particularly, to advantageous systems, methods, and computer readable medium for organizing and outputting buffered messages to a logging subsystem.

BACKGROUND OF THE INVENTION

Many of today's software applications which are being run on a computer system include a logging feature such as the Syslog utility provided by the GNU C library. This utility is utilized in conjunction with many operating systems, such as IBM's Z/OS, Unix, AIX and the like. Like most logging facilities, the Syslog utility is a heterogeneous network logging feature which provides one or more systems with the ability to store and process debug, trace, and error messages into a single data repository. A Syslog repository allows a system administrator or software developer to isolate problems with the system. Many applications which utilize a logging feature such as the Syslog facility simply write messages to the logging feature at the time a debug or trace point or error occurs in the system. In other words, log messages are written to a log in the order they are produced, sequentially one after another. For example, a software application may produce five log messages during its initialization and three log messages during the process of shutting itself down. If the application is started and then immediately stopped, eight log messages are written to the log in time order.

Internally, many of today's software applications are multilayered, meaning that the successful completion of a function performed at a particular layer of the application is dependent on the successful completion of a lower or higher layer. By way of example, consider an Internet Key Exchange (IKE) daemon supplying encryption keys to an internet protocol security communication (IP/SEC) stack. An IKE daemon is a software application which implements Requests for Comments (RFCs) 2407, 2408, and 2409. In particular, the IKE daemon provides two levels of keys for establishing a secure network communication path and securing the data exchange over the secure network communication path between two endpoints. The purpose of the first level or phase one is to create valid encryption keys for a limited time for the IP/SEC stack to establish the secure network communication path. Once the secure network communication path is established, the second level or phase two creates valid encryption keys to be used by the IP/SEC stack to encrypt the data between the two endpoints.

In the case of an IKE daemon, an endpoint, by way of a software application, will request a secure connection to send its data securely to another endpoint. In this example, phase two will be requested by the endpoint to secure the endpoints' data for transmission to the other endpoint. However, phase two must request a secure connection to be established from phase one. Consequently, phase one begins establishing a secure connection with the other endpoints. Once this connection is established, phase two begins generating keys to encode the endpoints data. The initial reporting of debug or trace messages and error messages or collectively referred to herein as log messages are typically from within the phase one and phase two portions of the software application. In the example above, the order of log messages to a Syslog repository could include phase two initialization messages, followed by phase one initialization, establishment, and completion messages, followed by phase two establishment and completion messages. As a result, the sequential outputting of messages in the software application makes the arrangement of messages in the Syslog facility difficult for a software developer to trouble shoot problems in phase two due to the interspersing of phase one messages. Furthermore, since the data of outputted log messages within a phase or between phases is typically not associated, each outputted log message typically becomes too large in order to provide enough useful information. Consequently, the Syslog file becomes cluttered and unorganized for the software developer to readily isolate the reported problem. Additionally, by sequentially outputting log messages when they occur, information which would be useful to be outputted with a particular log message during trouble isolation may not be available until after the particular message was logged. For example, the code section which contains a call to Syslog subsystem may not have access to the additional information or perhaps the information is not known until after the call to Syslog subsystem is invoked.

One prior approach to extracting useful information from the outputted log messages is to develop a software application to interpret the outputted log messages. However, this approach does not reduce the redundant information outputted in the log file which is typically significant. Such large outputted log files may cause network problems when being transmitting from a customer's site where a problem arises and the service engineer's site where trouble isolation is typically done.

SUMMARY OF THE INVENTION

The present invention recognizes the need to address problems resulting from sequentially outputting log messages and provides a computer implemented method, a computer readable medium, and a system to this end. Among its several aspects, the present invention defines a message block subsystem to buffer logical groupings of log messages in order to improve trouble isolation and validation of proper operation of application software. The computer implemented method also includes associating received log messages with items of work and organizing the received log messages according to the items of work. Each item of work contains one or more log messages. The computer implemented method may also suitably include outputting organized log messages according to items of work to a logging subsystem.

One aspect of the present invention advantageously organizes log messages according to an item of work to preclude log messages from different items of work to be interspersed in a logging subsystem. Another aspect of the present invention advantageously retrieves header information relevant to log messages associated with a particular item of work in order to acquire relevant information after a log message has been reported to the message block subsystem and to provide condensed output to aid in trouble isolation.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as apparatus, methods, or computer program code or some combination thereof. Accordingly, the present invention may take the form of an embodiment combining hardware and software aspects. Furthermore, the present invention may take the form of a computer program code on a computer-usable storage medium having computer-usable program code embodied in the medium. Any suitable computer readable medium may be utilized including hard disks, CD-ROMs, optical storage devices, flash memories, magnetic storage devices, and the like.

Computer program code or "code" for carrying out operations according to the teachings of the present invention may be written in various programming languages such as assembly, C, C++, Java, or other languages. Software embodiments of the present invention do not depend on implementation with a particular programming language. The program code may execute entirely on a user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer, for example, through the Internet using an Internet Service Provider.

Figure 1:
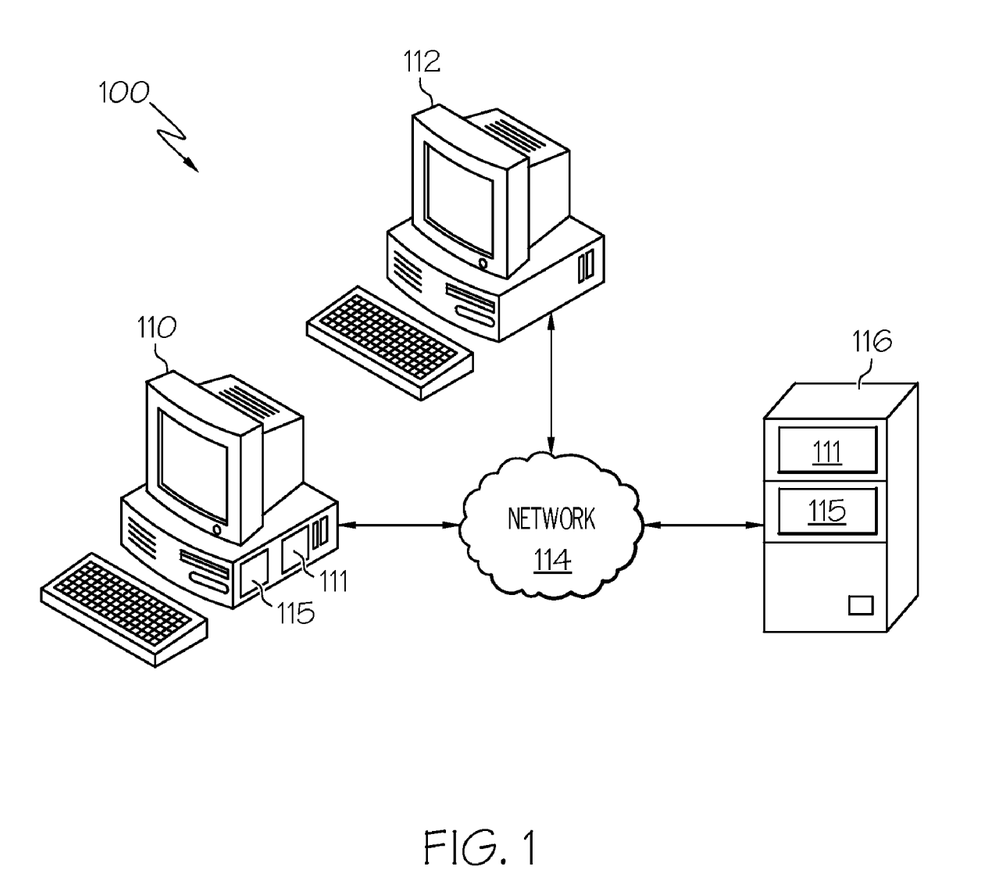
FIG. 1 shows an illustrative network environment employing message buffering in accordance with the present invention.

FIG. 1 shows an illustrative network environment 100 employing message buffering in accordance with the present invention. Network environment 100 includes a network 114 interconnecting two nodes 110 and 112 and a server 116. Node 110 contains a software application 115 such as IBM®'s IKE daemon which is a component of IBM's Communication Server suite of products. FIG. 1 illustrates two exemplary configurations in which message block subsystem 111 in a network environment in accordance with the present invention is located in a first and second location. In the first configuration, the message block subsystem 111 in accordance with the invention resides in node 110. In the second configuration, the message block subsystem 111 in accordance with the invention may reside in server 116. Typically, the message block subsystem 111 will reside with the application such as software application 115 which is generating the log messages, however, any machine running a software application may utilize message block subsystem 111 on its own machine or a server machine. Message block subsystem 111 and software application 115 are program code as defined above. Message block subsystem 111 contains a message block list structure and program instructions in accordance with the present invention and will be described further below in connection with FIG. 4.

In the first exemplary configuration, when software application 115 executes on node 110, the log messages generated by software application 115 are temporarily stored or buffered in message block subsystem 111 on node 110 in accordance with the present invention. In the second exemplary configuration, when the software application 115 executes on node 116, log messages are stored in message block subsystem 111 on server 116.

It should be noted that although the nodes 110 and 112 are depicted as general purpose computers, the present invention applies to any computer system including a laptop, server, a workstation, a desktop, or the like which runs message block subsystem 111 in accordance with the present invention. It should also be noted that although a network 114 is depicted in FIG. 1, the present invention also applies to a computer system running applications without a network connection.

Figure 2:
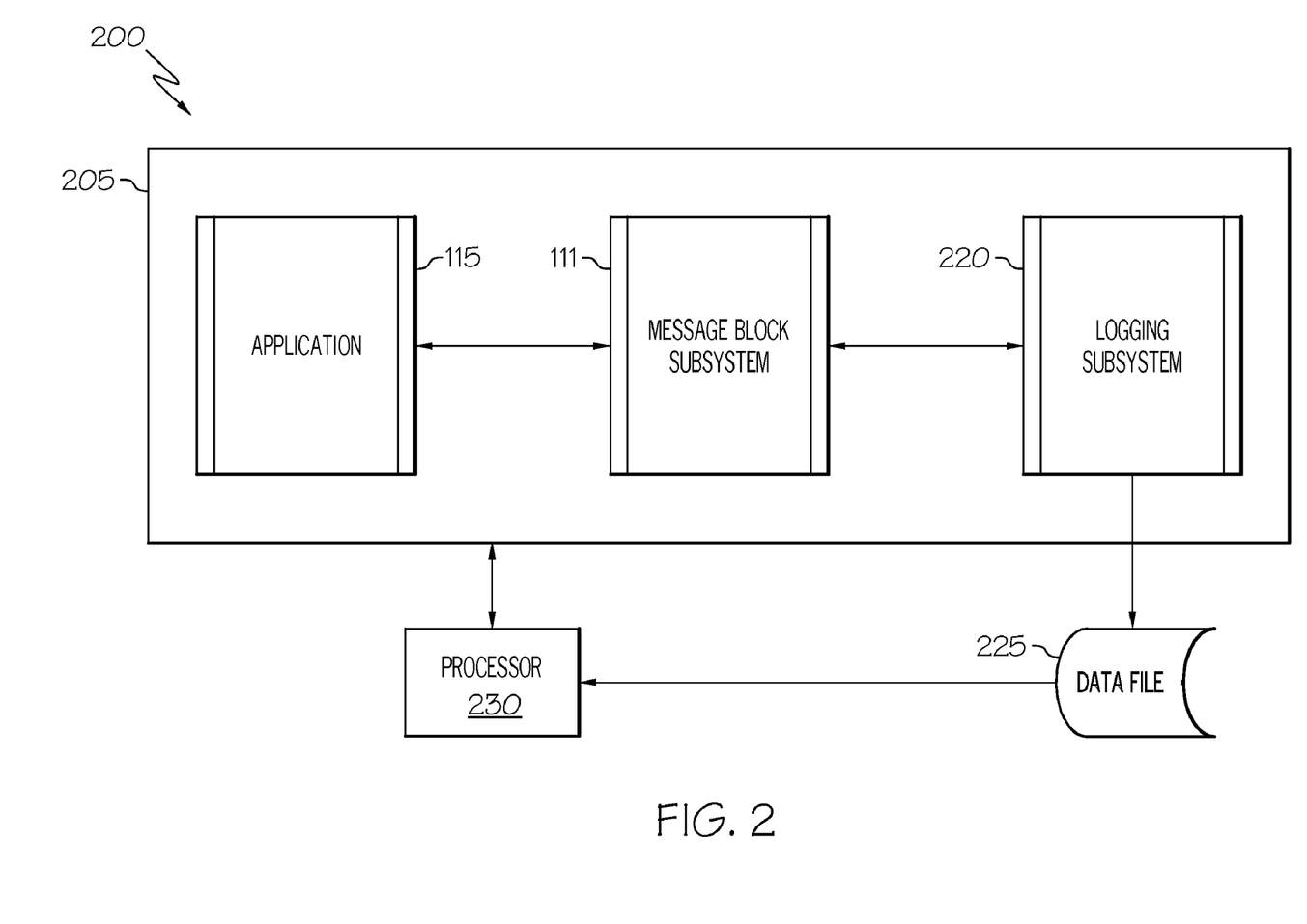
FIG. 2 shows a block diagram of a computer employing message buffering in accordance with the present invention.

FIG. 2 shows a block diagram of a computer 200 employing message buffering in accordance with the present invention. Computer 200 may suitably be similar to node 110. Computer 200 includes a processor 230, random access memory 205 and an external data repository 225 such as a hard drive, optical storage device, flash memory, magnetic storage device, or the like. At various stages of computer 200's operation, RAM 205 includes various instructions for various software subsystems such as application code 115, message block subsystem 111, and a logging subsystem 220 such as the Syslog subsystem. Processor 230 executes these instructions to accomplish the tasks defined by the various subsystems. Application code 115 and the message block subsystem 111 communicate with each other through function calls as described further in connection with FIG. 3 or a messaging subsystem which conveys the same information as the function calls. Similarly, the message block subsystem 111 and the logging subsystem 220 communicate through interfaces published by the logging subsystem 220 such as those published in The GNU C Library Reference Manual, for Version 2.3.x of the GNU C Library. The logging subsystem 220 outputs log messages to external data repository 225 typically in the form of a data file or system console.

Figure 3:
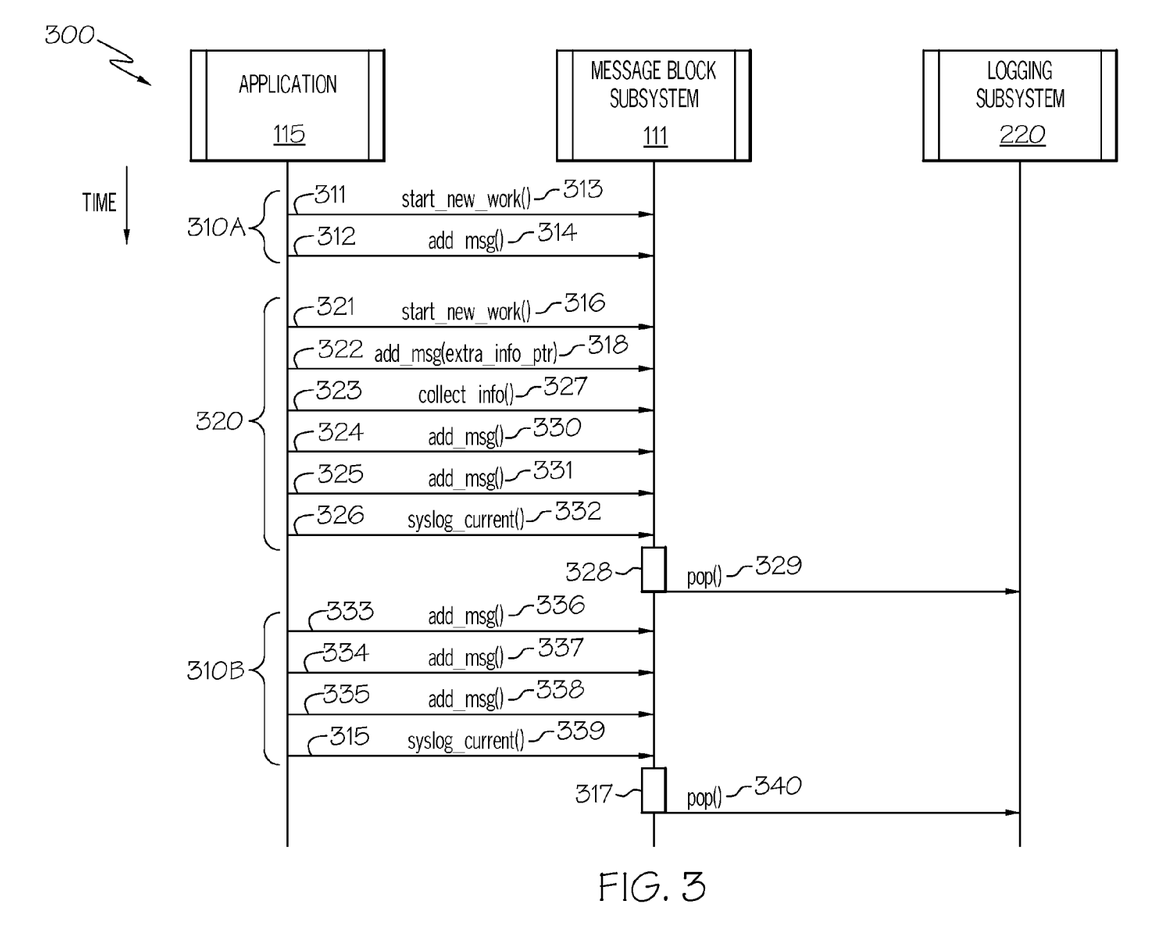
FIG. 3 shows an exemplary calling sequence illustrating the external interfaces of the message block subsystem of FIG. 2.

FIG. 3 shows an exemplary calling sequence 300 illustrating the external interfaces of the message block subsystem of FIG. 2. In this exemplary calling sequence 300, application 115 performs two concurrent items of work. Calling sequences 310A and 310B correspond to the first item of work and calling sequence 320 corresponds to the second item of work. It should be noted that application 115 defines the beginning and end of an item of work.

In operation, when application 115 recognizes a new item of work is about to begin, application 115 calls the start_new_work( ) function 313 at time 311 on the message block subsystem 111. For example, if application 115 is an IKE daemon, a new item of work may be defined when a phase two session has been requested. The call to start_new_work( ) 313 function by application 115 signals the message block subsystem 111 that a new item of work has begun. The message block subsystem 111 allocates a message block item and optionally returns an address to the message block item. The message block item can be viewed as a container for log messages corresponding to the same item of work and is described in further detail below in connection with FIG. 4.

At time 312, application 115 may call add_msg( ) function 314 on the message block subsystem 111 to buffer a message with the message block subsystem 111. For example, if application 115 is an IKE daemon, an initialization log message for phase two may be buffered with the call to add_msg( ) during phase two. The message to be buffered and eventually logged would typically contain text or a reference number indicating text, a severity level such as informational, warning, error, and the like, and a flag. The flag may be used to indicate that a log message has been previously sent or is redundant. Thus, the flag may be used at log time to determine whether to log the message with the logging subsystem 220. For example, the flag of a present log message may indicate whether a more specific log message has already been buffered, thus, removing the need to output the present log message. In another example, the flag may indicate that subsequent redundant messages need not be outputted to the logging subsystem 220.

At time 321, application 115 recognizes a second item of work before the first item of work is completed. For example, in the IKE daemon example, a phase one session needs to be established before a phase two session is properly established. During phase two establishment, the IKE daemon may discover that a phase one session has not yet been established. Consequently, application 115 makes a call to start_new_work( ) function 316 on the message block subsystem 111 to indicate that a new work item is beginning, such as phase one session establishment. The message block subsystem 111 allocates a second message block item and optionally returns an address to the second message block item for the second item of work. Within the message block subsystem 111, the message block items are preferably buffered in a stack structure such that the latest message block item created is pushed on top of the stack.

At time 322, application 115 makes a call to the add_msg( ) function 318 to buffer a message corresponding to the second item of work. The call to add_msg( ) function 318 is similar to the call at time 312. However, at time 322, an extra information pointer (extra_info_ptr) is passed to the message block subsystem 111. The extra information pointer advantageously provides a mechanism for the message block subsystem 111 to retrieve application information which is relevant to the log message and to the second item of work in general. For example, if the application 115 is an IKE daemon and the second item of work is a phase one session, the extra_info_ptr pointer may reference the phase one session's programming environment which may include an associated calling stack, local and remote IKE identification information, local and remote IKE internet protocol (IP) port information and any pending phase two information. This retrieved information is typically used to construct a message block header which is then outputted with one or more corresponding messages to the logging subsystem. It should be noted that other programming techniques other than address or object passing between application 115 and message block subsystem 111 are contemplated and that the present invention should not be limited to the presently described function names and parameters passed between functions.

At time 323, application 115 recognizes that the address pointed to by the extra information pointer may shortly become invalid. In response to this recognition, application 115 makes a call to collect_info( ) function 327 on the message block subsystem 111. The collect_info( ) function 327 is a trigger for the message block subsystem 111 to collect the information associated with the work item and referenced by, for example, the extra_info_ptr pointer. The collect_info( ) function 327 may be alternatively embodied to collect the information from the extra information pointer associated with the message block item on the top of the stack. The collect_info( ) function 327 is typically called when the object or memory pointed to by the extra information pointer is about to be destroyed or become inaccessible. Otherwise, the collection of extra information from application 115 is performed when application 115 calls the syslog_current( ) function 332 which will be described below.

At time 324, a call to add_msg( ) function 330 is made to buffer a second message associated with the second work item. At time 325, a call to add_msg( ) function 331 is made to buffer a third message associated with the second work item. At time 326, application 115 recognizes that the second work item has completed and, thus, calls the syslog_current( ) function 332 on the message block subsystem 111. The syslog_current( ) function 332 collects additional information from application 115, if any exists, creates a header for the log messages associated with the message block item found at the top of a stack of message block items, and internally calls the pop( ) function 329. The pop( ) function 329 appends the header to the log messages associated with the message block item and forwards the appended log messages to the logging subsystem 220. Since the second work item is complete and the first work item was dependent on the successful completion of the second work item, it should be noted that at time 328 the log messages corresponding to the second work item have been outputted to the logging subsystem 220 as a group. The logging subsystem 220 is typically a sequential logger and thus outputs the messages sequentially to a system console or data file. If the application 115 is an IKE daemon, for example, the phase one log messages are outputted as a group before the phase two log messages, thus, organizing the log messages in a functional manner. This organization allows a software developer or network service personnel to easily navigate the data file.

Returning to the remaining calling sequence of the first unit of work 310B, the application 115, at times 333, 334, and 335 makes three calls to the add_msg( ) functions 336, 337, and 338, respectively, to buffer three additional messages with the message block subsystem 111 during the remaining calling sequence of the first unit of work 310B. At time 315, application 115 recognizes that the first unit of work successfully completed and, thus, calls the syslog_current( ) function 339 to process and output all the log messages corresponding to the first unit of work. The syslog_current( ) function 339 collects additional information from application 115, if any exists, creates a header for the log messages associated with the message block item found at the top of a stack of message block items, which in this case are associated the first item of work, and internally calls the pop( ) function 340 at time 317.

Figure 4:
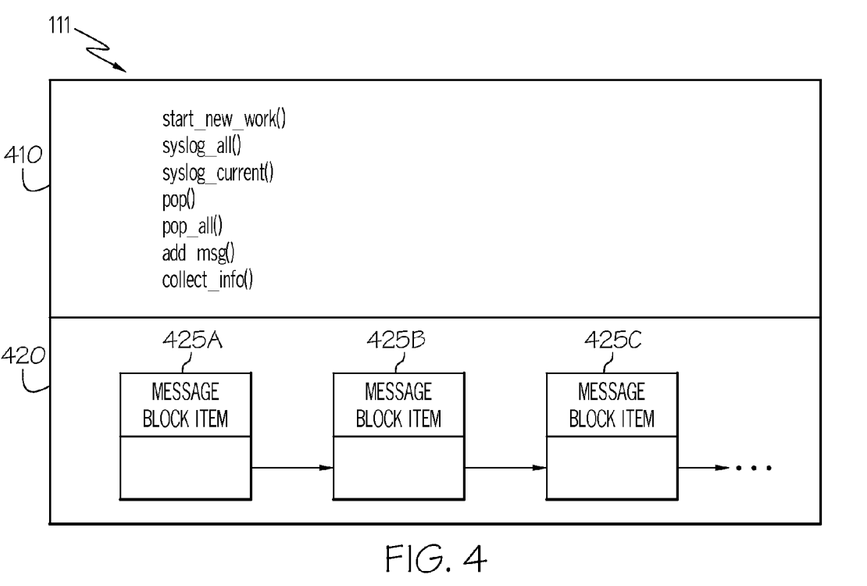
FIG. 4 shows a block diagram of an exemplary message block list structure in accordance with the present invention.

FIG. 4 shows a block diagram of an exemplary message block subsystem 111 in accordance with the present invention. The message block subsystem 111 contains functions 410 and a list of message block items 420. The list of message block items 420 may contain one or more message block items. As depicted in FIG. 4, three message block items 425A-425C are illustrated. The list of message block items 420 preferably operates as a stack structure where the most recent message block item is located at the top, the left in FIG. 4, of the stack and the oldest message block item is located at the bottom, the right in FIG. 4, of the stack. The list of message block items 420 may operate as other structures such as an ordered list, an unordered list, or the like. With these other structure types, a work identification is passed between an application, such as application 115, and the message block subsystem 111 in order for the message block subsystem to find the desired message block item. When operating as a stack structure, as shown in FIG. 4, message block item 425C is the oldest depicted message block item and message block item 425A is the newest message block item.

As shown in FIG. 3, when an application such as application 115 recognizes a new work item, the start_new_work( ) function is called. The start_new_work( ) function will create or allocate a new message block item such as message block item 425A and push the new message block item onto the top of the list of message block items 420.

As shown in FIG. 3, each time an application wants to add a log message to the message block subsystem 111 the add_msg( ) function is called. Internally, the add_msg( ) function finds the message block item corresponding to the work item for which the log message is associated and adds the log message to the associated message block item. If the list of message block items 420 preferably behaves as a stack, the finding step simply involves retrieving the message block item on the top of the stack.

As shown in FIG. 3, when an application recognizes that work item has completed, the syslog_current( ) function is called by the application. In turn, the syslog_current( ) function calls the internal pop( ) function. The pop( ) function will process all the log messages added to a message block item, preferably the message block item on the top of the stack. In addition to steps performed by the pop( ) function described in connection with FIG. 3, once the log messages have been logged to the logging subsystem 220, the message block item is deallocated from the message block subsystem 111. For example, if message block item 425A was being processed, it would be removed from the stack, thus, message block 425B would now be the message block item on the top of the stack. The processing of the log messages will be described in further detail in connection with FIG. 4.

As shown in FIG. 3, when an application knows that certain information associated with a logged message is about to be destroyed, the collect_info( ) function is called. The collect_info( ) function retrieves the extra information associated with a message block item and stores that information in the message block item.

The syslog_all( ) function is a convenient function to allow all the messages associated with all the message block items to be outputted to the logging subsystem. Internally, the syslog_all( ) function would call the pop_all( ) function. The pop_all( ) function calls the pop( ) function for each message block item in message block subsystem. The processing of a specific log message will be discussed further in connection with FIG. 5.

Figure 5:
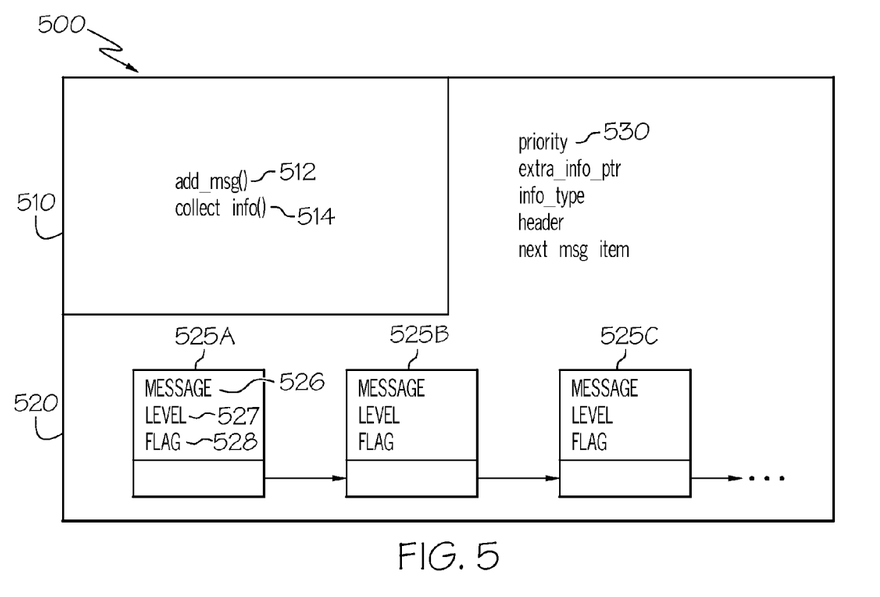
FIG. 5 shows a block diagram of an exemplary message block item in accordance with the present invention.

FIG. 5 shows a block diagram of an exemplary message block item 500 in accordance with the present invention which may suitably be employed to implement message block items 425A-425C. Message block item 500 contains a function portion 510 and a data portion 520. The data portion 520 includes variables which represent the priority of the message block item, an optional header information, an optional pointer to extra information associated with the message block item, the type of extra information, and a reference to the next message block item. For example, the extra information associated with the message block may include a security association (SA) number, an Internet protocol (IP) security address, and the like.

The extra_info_ptr pointer typically contains an address in the application's data space which stores the extra information. The info_type field indicates what type of information is being referred to by the extra_info_ptr pointer. Consequently, when the message items of a message block item are about to be outputted to the logging subsystem or when the information being referenced by the extra_info_ptr pointer is about to be destroyed, the extra information may be retrieved from the application, formatted and stored in the header data type. One technique to accomplish the header formatting is to require the application to provide a call back function which would be implemented by the application that receives the extra_info_ptr pointer and info_type field and an address of the header data type as parameters. In this technique, the application which is familiar with the data can be modified to provide a utility to be called by the message block subsystem 111 to format the data into a header.

Additionally, the data portion 520 includes a list of message items 525A-525C. As depicted in FIG. 5, three message items 525A-525C are illustrated. The list of message items preferably operates as a stack structure where the most recent message item is located at the top of the stack and the oldest message item is located at the bottom of the stack. The list of message items may operate as other structures such as an ordered list, an unordered list, and the like.

The function portion 510 includes add_msg( ) and collect_info( ) functions 512 and 514, respectively. The add_msg( ) function 512 is called by the message block subsystem's add_msg( ) function described above in connection with the discussion of FIG. 4 whenever an application, such as application 115, desires to buffer a message. The message block item's add_msg( ) function 512 allocates or creates a new message item such as the message item 525A and adds message text 526 or reference identification associated with the text to the message item. The add_msg( ) function 512 also adds a level identifier 527 to the message item to indicate its level. For example, the level identifier 527 may indicate whether the message is a trace message, an informational message, a warning message, or a critical error message.

The collect_info( ) function 514 is typically called from the message block subsystem's collect_info( ) and pop( ) functions. The message block item's collect_info( ) function 514 collects information from the calling application to populate the extra information data field of the message block item 500, if needed. This feature allows information to be gathered over the course of the running application after a log message has been buffered in the message block subsystem 111 and before the log message has been logged to the logging subsystem 220. For example, when the application is an IKE daemon, information such as IKE endpoints is gathered at the beginning of the negotiation, however, the endpoint identities are not initially known and do not become known until later in the negotiation process. As described below, this later generated extra information can then be retrieved at the time the message block item is about to be outputted to the logging subsystem 220. The extra information can be formatted as a header and precede all the log messages associated with the message block item when being outputted to the logging system. This behavior typically occurs when the collect_info( ) function 514 is called by the pop( ) function. An exemplary output showing header information will be discussed further in connection with FIG. 6.

When the collect_info( ) function 514 is called by the pop( ) function, the pop( ) function will format the collected information to build a header to be outputted with each message item. The pop( ) function loops through the list of message items and may use message items' flags, such as flag 528, and other information to determine whether a message should be written to a logging subsystem. The pop( ) function allows for a user of an application to specify a filter to filter out specific log messages from being outputted to the logging subsystem. For example, the user may only be interested in trace messages so that only trace messages are outputted to the logging subsystem. By way of another example, the user may only be concerned with trace messages and critical errors. In this case, a filter may be set by the user and the pop( ) function would output log messages which were either trace messages or critical errors.

The priority data item 530 of the message block item 500 is determined by the most severe of all the messages in the message list. For example, if message item 525A had a level which was set to informational, message item 525B had a level which was set to warning, and message item 525C had a level which was set to critical, the priority data item 530 would contain the setting of critical. In this way, when the header information is logged with the logging subsystem, the filters of the logging subsystem will not restrict the header information from being outputted. For example, if a user selects a filter in the logging subsystem to only output critical messages, the header and critical message stored in message item 525C will be outputted by the logging subsystem.

Figure 6:
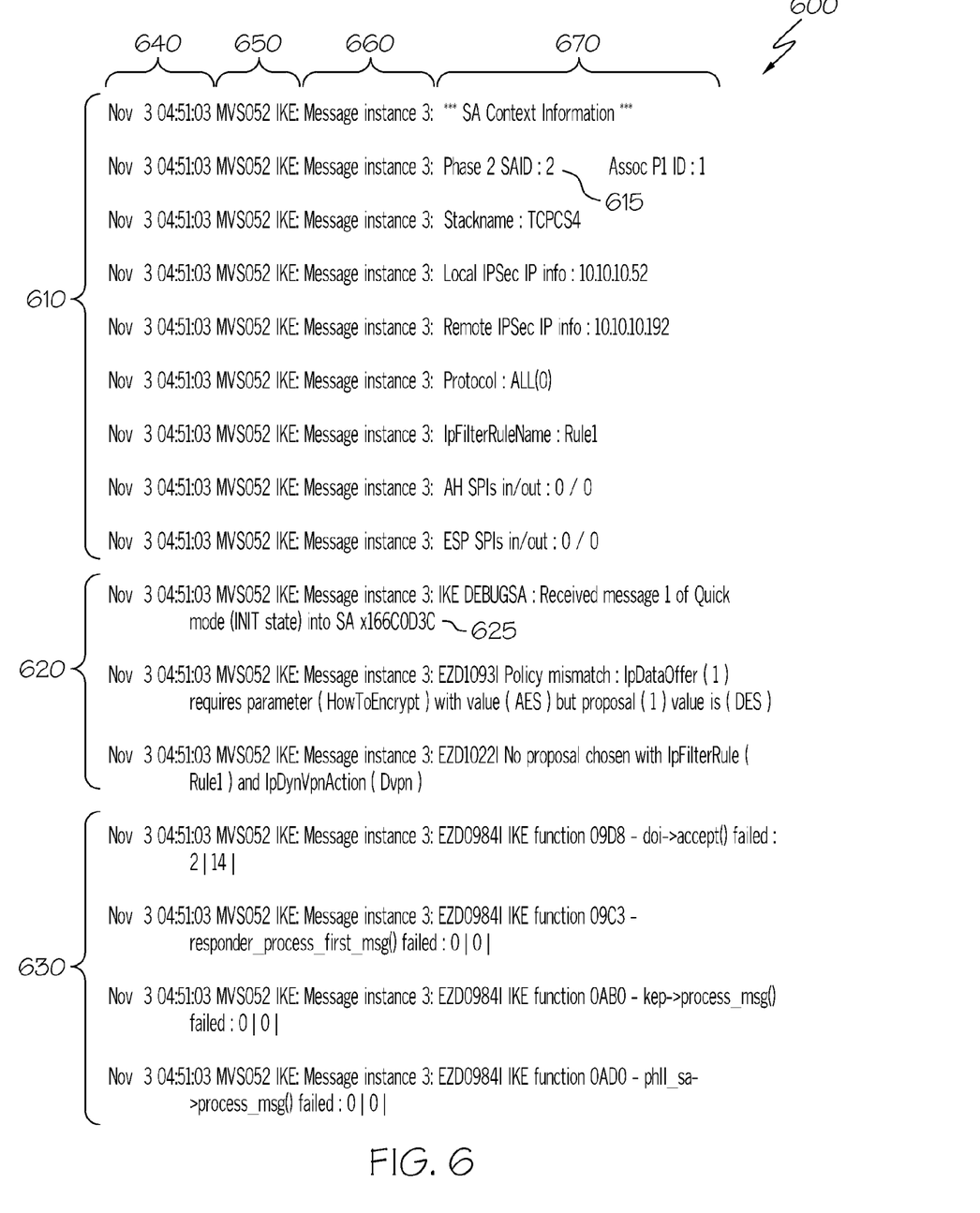
FIG. 6 shows an exemplary output in accordance with the present invention of log messages for a phase two negotiation item of work which failed.

FIG. 6 shows an exemplary log output 600 after message buffering in accordance with the present invention of log messages for a phase two negotiation item of work which failed. The exemplary output 600 includes three main columns of information 640, 650, 660, and 670. Column 640 specifies the date a message is outputted to the logging subsystem 220. Column 650 specifies the application which has initially generated the message. Column 660 specifies the work item associated with a message. Column 670 specifies additional data relevant to the message.

The exemplary output 600 includes a header portion 610, a phase two log message portion 620, and a set of redundant log messages portion 630. It should be noted that the time stamps in the exemplary output 600 represent the time the corresponding message was outputted to the logging system 220 and not the time the log messages were buffered to the message block subsystem. The header portion 610 contains information relevant to the failed phase two negotiation item of work, in general, and contains information such as the local IP security address, remote IP security address, IP filter rule name, and the like. All of the messages in the exemplary log contain a message instance number, for example the number 3. This number is used to associate all the messages in this item of work. It should be noted that as a result of the buffering of the message block subsystem, there are no interspersed messages associated with another item of work outputted.

Also, note that the log messages in portion 620, while informative and to the point, do not carry some vital information that identifies which security association (SA) was experiencing a problem. Log message 625 shows the SA to equal an address which indicates that the contents of the address had not been valid at the time log message 625 was buffered to the message block subsystem. However, also note SA 615 which is located in the header portion 610. SA 615 has been reconciled to contain a value of 2. The header information was collected before outputting the messages to the logging subsystem and after the log messages in portion 630 were buffered to the message block subsystem. This exemplary log output exemplifies that information gathered after the log messages are buffered to the message block subsystem is garnered and displayed in the header information to supply additional relevant information in a condensed manner.

For illustrative purposes, the redundant message portion 630 is shown here to demonstrate which log messages are normally filtered. They are displayed in exemplary output 600 because a filter option which allows display of redundant messages was selected. Referring to FIG. 5, such a selection has the effect of setting the flag of the message items corresponding to these redundant messages in the list of message items. If the filter option was deselected, redundant message portion 630 would not be displayed.

A method of buffering log messages according to a unit of work in accordance with the present invention is disclosed. At a first step, an item of work is defined. As described above, an application such as application 115 typically defines an item of work by calling the start_new_work( ) function on the message block subsystem 111. However, the present invention contemplates implicitly defining an item of work itself within the implementation of the start_new_work( ) function. At a second step, a log message is received from an application such as application 115. As described above, this step may be implemented by a call to the add_msg( ) function in the message block subsystem. At a third step, it is determined whether the received message is associated with the defined item of work defined in the first step. In other words, the method determines whether a message block item exists to which a log message may be associated. If so, the method proceeds to a fourth step. At the fourth step, the received log message is organized according to the associated item of work.

If the received log message was not associated with an item of work, then the method proceeds to a contingent step. At the contingent step, another work item is defined and the method then proceeds to the fourth step. The third and contingent steps may alternatively be implemented in the application.

At a fifth step, the organized log message is buffered. At a sixth step, the method determines whether it is time to report the organized log messages for an item of work. This determination may be made in various manners. For example, perhaps only the log messages associated with the latest item of work or message block item needs to be outputted. If so, the application may call the syslog_current( ) function. Additionally, if all the log messages associated with all the work items or message block items need to be outputted, the application may call the syslog_all( ) function. Other function calls to support subfunctions of the mentioned functions are also contemplated. For example, one function may output all messages for a specific item of work and another function may output the last message added for a specific item of work. At the sixth step, a common header containing information associated with the work item is optionally prepared. At a seventh step, the optional common header and the organized, buffered log messages for the item of work are outputted to a logging subsystem, such as logging subsystem 220.

While the present invention is disclosed in the context of specific exemplary software functions, many variations to these software functions are contemplated. For example, the parameters passed between the application 115 and the message block subsystem 111 may vary to allow a unique work item identifier so that multiple applications can utilize the same message block subsystem. Furthermore, the specific software functions may be combined and varied according to a programmer's desires to meet the context of the particular application and environment.

While the present invention has been disclosed in the context of various aspects of presently preferred embodiments, it will be recognized that the invention may be suitably applied to other environments consistent with the claims which follow.

What is claimed is:

1. A computer implemented method for buffering log messages, comprising:

an application concurrently executing a plurality of different units of work, wherein the application defines a beginning and an ending of each of the units of work, wherein the application calling a plurality of log messages for a logging subsystem, wherein one or more of the log messages are called for each of the units of work;

receiving the plurality of log messages for the logging subsystem at a message block subsystem;

in the message block subsystem associating each of the plurality of log messages with one of a plurality of items of work;

organizing the received plurality of log messages in the message block subsystem according to their associated one of the plurality of items of work; and outputting organized log messages according to the plurality of items of work to the logging subsystem, wherein the log messages associated with each of the plurality of items of work are output as a group to the logging subsystem upon completion of the associated item of work, which results in the log messages being recorded in the logging subsystem in a different order than that which the messages would have been recorded in if the log messages were sent directly to the logging subsystem instead of being handled and organized by the message block subsystem.

2. The computer implemented method of claim 1 wherein the organizing further comprises:

arranging the received log messages in a stack structure in the messaging block subsystem in accordance with each log message's associated item of work, wherein log messages for each item of work are grouped into message block items in the message block subsystem, wherein the received log messages are stored within the stack structure until the application indicates the end of the unit of work at which point the outputting responsively occurs.

3. The computer implemented method of claim 1 wherein outputting the organized log messages is performed by:

outputting the organized log messages as a group according to an order of completion of each of the plurality of items of work, and without regard to an order of initiation of each of the items of work, wherein in absence of the message block subsystem and the receiving, associating, organizing, and outputting, the log messages would be placed in the logging subsystem in a sequential order by execution time, which would result in the log messages for the different units of work being interspersed with each other, as opposed to being grouped together in the logging subsystem per the outputting of the organized log messages as a group.

4. The computer implemented method of claim 1 wherein each of said one or more log messages are directed by the application to a logging subsystem, wherein the logging subsystem is designed to sequentially record the log messages in the order in which the logging subsystem receives the log messages, wherein the log messages consist of debug messages, trace messages, error message, warning messages, and information messages.

5. The computer implemented method of claim 1 further comprising:

preparing a common header for each of the log messages associated with one of the plurality of items of work in the message block subsystem, the common header identifying the item of work.

6. The computer implemented method of claim 5 wherein preparing the common header further comprises:

retrieving work item information from a calling application, wherein the work item information comprises extra information not explicitly sent from the application via a call to one of the log messages, wherein said extra information relates to the execution of the work item.

7. The computer implemented method of claim 1, further comprising:

before outputting the organized log messages, applying a previously specified filter to the organized log messages, wherein said previously specified filter filters out all log messages of a specified type; and after applying the filter, outputting a remaining subset of the organized log messages according to the plurality of items of work to the logging subsystem.

8. A non-transitory computer-readable medium whose contents cause a computer system to buffering log messages, by performing the steps of:

receiving log messages at a messaging block subsystem from an application generating the log messages for a plurality of different units of work, wherein the log messages consist of debug messages, trace messages, error message, warning messages, and information messages, wherein an application explicitly calls functions to explicitly start each of the units of work and to end each of the units of work, wherein each log message is explicitly called by the application when executing corresponding unit of work, wherein each log messages called by the application is intended to be ultimately conveyed and stored within a logging subsystem, wherein the logging subsystem is designed to sequentially record the log messages in the order in which the logging subsystem receives the log messages;

conveying each of the log messages from the application through a message block subsystem before conveying the log messages to the logging subsystem;

after conveying the log messages from the application to the message block subsystem, storing each of the log messages within a data structure specific to one of a plurality of items of work;

and upon receiving an indication from the application that processing for one of the work items has ended, outputting organized log messages from the data structure corresponding to the ended work item to the logging subsystem, wherein the logging subsystem receives the outputted log messages from the message block subsystem in a different order than one by which the application explicitly called the log messages, and wherein the logging subsystem receives the outputted log messages as organized by the unit of work to which the log messages correspond.

9. The non-transitory computer-readable medium of claim 8, wherein the data structure is a stack, where the logged messages are pushed onto the stack in the order that received by the message block subsystem, and wherein the outputting pops of the logged messages in the stack corresponding to the work item from the stack for conveyance to the logging subsystem.

10. The non-transitory computer-readable medium of claim 8 wherein outputting the organized log messages is performed by:

outputting the organized log messages as a group according to an order of completion of each of the plurality of items of work, and without regard to an order of initiation of each of the items of work.

11. The non-transitory computer-readable medium of claim 8 further comprising:

the application concurrently executing a plurality of different units of work, wherein the application defines a beginning and an ending of each of the units of work, wherein the application calling a plurality of log messages for a logging subsystem, wherein one or more of the log messages are called for each of the units of work.

12. The non-transitory computer-readable medium of claim 8 further comprising:
preparing a common header for each of the log messages associated with one of the plurality of items of work in the message block subsystem, the common header identifying the item of work.

13. The non-transitory computer-readable medium of claim 12 wherein preparing the common header further comprises:
retrieving work item information from a calling application.

14. The non-transitory computer-readable medium of claim 8, wherein:
the message block subsystem is locally located with the application generating the log messages and the logging subsystem is located remotely from the message block subsystem.

15. A computer system comprising hardware for buffering log messages conveyed from an application to a logging subsystem, wherein said logging subsystem is designed to sequentially record the log messages in the order in which the logging subsystem receives the log messages comprising:
means for receiving, via the computer system executing program code, log messages at a messaging block subsystem from the application generating the log messages, wherein the application explicitly defines the beginning and ending of the unit of work, and wherein the application is able to concurrently execute different units of work, and wherein each of the log messages consists of a debug message, a trace message, an error message, a warning messages, and an information message that was expressly called by the application when the application was executing a corresponding one of the units of work;
means for associating, via the computer system executing computer program code, each of the log messages with one of a plurality of items of work performed by the application
means for organizing, via the computer system executing computer pro gram code, the received plurality of log messages in the message block subsystem according to their associated one of the plurality of items of work; and
means for outputting, via the computer system executing computer program code, organized log messages according to the plurality of items of work to a logging subsystem, wherein the log messages associated with each of the plurality of items of work are output as a group to the logging subsystem upon completion of the associated item of work.

16. The computer system of claim 15 wherein the organizing means further comprises:
means for arranging, via the computer system executing computer program code, the received log messages in a stack structure in the messaging block subsystem in accordance with each log message's associated item of work, wherein log messages for each item of work are grouped into message block items in the message block subsystem.

17. The computer system of claim 15 wherein the means for outputting organized log messages further comprises:
means for outputting, via the computer system executing computer program code, the organized log messages as a group according to an order of completion of each of the plurality of items of work, and without regard to an order of initiation of each of the items of work.

18. The computer system of claim 15 wherein the logging subsystem is the syslog subsystem, and wherein the message block subsystem is located locally with the application generating the log messages and remotely from the syslog subsystem.

19. The computer system of claim 15 further comprising:
means for preparing, via the computer system executing computer program code, a common header for each of the log messages associated with one of the plurality of items of work in the message block subsystem, the common header identifying the item of work.

20. The computer system of claim 19 wherein the means for preparing further comprises:
means for retrieving, via the computer system executing computer program code, work item information from a calling application.

* * * * *